US008535558B2

(12) United States Patent
Jung et al.

(10) Patent No.: US 8,535,558 B2
(45) Date of Patent: Sep. 17, 2013

(54) MICROCAPSULES WITH POLYVINYL MONOMERS AS CROSSLINKER

(75) Inventors: Marc Rudolf Jung, Worms (DE); Tobias Joachim Koplin, Ludwigshafen (DE); Stephan Altmann, Ruppertsberg (DE); Bogdan Moraru, Mannheim (DE); Marco Schmidt, Speyer (DE); Tina Schroeder-Grimonpont, Rheinzabern (DE); Hans Willax, Maxdorf (DE); Britta Katz, Dannstadt-Schauernheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/383,334

(22) PCT Filed: Jul. 9, 2010

(86) PCT No.: PCT/EP2010/059888
§ 371 (c)(1),
(2), (4) Date: Jan. 10, 2012

(87) PCT Pub. No.: WO2011/004006
PCT Pub. Date: Jan. 13, 2011

(65) Prior Publication Data
US 2012/0112122 A1 May 10, 2012

Related U.S. Application Data

(60) Provisional application No. 61/327,729, filed on Apr. 26, 2010.

(30) Foreign Application Priority Data

Jul. 10, 2009 (EP) .................................. 09165134
Apr. 26, 2010 (EP) .................................. 10160998

(51) Int. Cl.
*C09K 5/00* (2006.01)
(52) U.S. Cl.
USPC ........................................... 252/70; 427/180

(58) Field of Classification Search
None
See application file for complete search history.

(56) References Cited

U.S. PATENT DOCUMENTS

| 8,034,887 | B2 | 10/2011 | Jung |
| 2009/0256107 | A1 | 10/2009 | Hentze et al. |
| 2010/0068525 | A1 | 3/2010 | Jung et al. |
| 2010/0286018 | A1 | 11/2010 | Hentze et al. |
| 2010/0327216 | A1 | 12/2010 | Jung et al. |
| 2011/0024035 | A1 | 2/2011 | Koplin et al. |

FOREIGN PATENT DOCUMENTS

| WO | 2008 006762 | | 1/2008 |
| WO | 2008 071649 | | 6/2008 |
| WO | WO 2008071649 | * | 6/2008 |
| WO | 2009 040359 | | 4/2009 |

OTHER PUBLICATIONS

U.S. Appl. No. 13/499,502, filed Mar. 30, 2012, Willax, et al.
U.S. Appl. No. 13/372,864, filed Feb. 14, 2012, Schroeder-Grimonpont, et al.
International Search Report Issued Jan. 7, 2011 in PCT/EP10/59888 Filed Jul. 9, 2010.
U.S. Appl. No. 13/376,226, filed Dec. 5, 2011, Jung, et al.

* cited by examiner

*Primary Examiner* — Necholus Ogden, Jr.
(74) *Attorney, Agent, or Firm* — Oblon, Spivak, McClelland, Maier & Neustadt, L.L.P.

(57) ABSTRACT

The present invention relates to microcapsules comprising a capsule core and a capsule wall, where the capsule wall is constructed from
50 to 90% by weight of one or more $C_1$-$C_{24}$-alkyl esters of acrylic acid and/or methacrylic acid (monomers I),
10 to 50% by weight of one or more polyvinyl monomers (monomers II), and
0 to 30% by weight of one or more monounsaturated, non-ionizable monomers (monomer III), which are different from the monomers I
in each case based on the total weight of the monomers, to a process for their preparation, and to their use in binding construction materials, textiles and heat transfer liquids.

17 Claims, No Drawings

MICROCAPSULES WITH POLYVINYL MONOMERS AS CROSSLINKER

The present invention relates to microcapsules comprising a capsule core and a capsule wall constructed from $C_1$-$C_{24}$-alkyl esters of acrylic acid and/or methacrylic acid, polyvinyl monomers, and, if appropriate, other monomers without ionizable radicals. Moreover, the present invention relates to a process for their preparation, their use in binding construction materials, textiles and heat transfer liquids.

In recent years there have been diverse developments in the field of microencapsulated latent heat storage media. The mode of function of latent heat storage media, often also referred to as PCM (phase change material), is based on the enthalpy of conversion which arises during the solid/liquid phase transition, which signifies an absorption of energy or release of energy into the surrounding area. They can thus be used for keeping a temperature constant within a fixed temperature range.

Thus, EP-A-1 029 018 and EP-A 1 321 182 teach the use of microcapsules having a capsule wall of highly crosslinked methacrylate polymer and a latent heat storage core in binding construction materials such as concrete or gypsum. DE-A-101 39 171 describes the use of microencapsulated latent heat storage materials in gypsum plasterboards. The microcapsule walls are constructed through polymerization of methyl methacrylate and butanediol diacrylate in the presence of inorganic solid particles as protective colloid. In addition, WO 2005/116559 teaches the use of microencapsulated latent heat storage materials in chipboard panels together with melamine-formaldehyde resins as binder.

The latent heat storage materials used are often organic waxes which melt upon exceeding the phase transition. If such microcapsules are used in porous construction materials such as concrete or gypsum, then in the case of capsules with insufficient tightness, a slight escape of waxes can be observed over a prolonged period. However, exudations of this type are undesired particularly in interiors, and so tighter capsules are the object of the present invention.

The earlier application PCT/EP 2009/050319 teaches capsule walls made of methyl methacrylate, dimethylaminoethyl methacrylate and a crosslinker mixture with fragrances as core material.

Microcapsules with improved tightness are described, for example, in WO 2008/071649, the walls of which have been crosslinked by means of a crosslinker mixture which comprised 20 to 80% by weight of a polyvinyl monomer. However, the walls comprise up to 70% by weight, based on the total monomers, of methacrylic acid in copolymerized form. At particle sizes of 1.5 to 2.5 µm in the textile sector, these capsules exhibit good tightnesses with regard to resistance to cleaning and good evaporation rates at 180° C.

However, it has been found that microcapsules with capsule sizes of 1 to 50 µm, as are customarily used in the construction sector, processed into gypsum construction boards, have an unsatisfactory tightness. It thus appears not only to be important to have to have good tightness at the high processing temperatures, but an additional requirement is a good evaporation rate at temperatures at which the wall regions of the capsules still do not exhibit increased mobility. It is assumed that this temperature is in the region of the glass transition temperature of the homopolymer of the non-crosslinking main monomer. It was therefore an object of the present invention to provide microcapsules for construction applications with good evaporation rate in the temperature range from 15 to 105° C. It was a further object to develop construction materials with low emission values, based on high-boiling components.

Accordingly, microcapsules have been found, comprising a capsule core and a capsule wall, where the capsule wall is constructed from 50 to 90% by weight of one or more $C_1$-$C_{24}$-alkyl esters of acrylic acid and/or methacrylic acid (monomers I), 10 to 50% by weight of one or more polyvinyl monomers (monomers II), and 0 to 30% by weight of one or more monounsaturated, nonionizable monomers (monomer III), which are different from the monomers I in each case based on the total weight of the monomers, a process for their preparation, and their use in binding construction materials, textiles and heat transfer liquids.

The microcapsules according to the invention comprise a capsule core and a capsule wall. The capsule core consists predominantly, to more than 95% by weight, of lipophilic substance. The average particle size of the capsules (centrifugal average by means of light scattering) is 1 to 50 µm. According to one preferred embodiment, the average particle size of the capsules is 1.5 to 15 µm, preferably 4 to 10 µm. Here, preferably 90% of the particles have a particle size of less than twice the average particle size.

The weight ratio of capsule core to capsule wall is generally from 50:50 to 95:5. Preference is given to a core/wall ratio of 70:30 to 93:7.

The polymers of the capsule wall generally comprise at least 50% by weight, in preferred form at least 55% by weight and in particularly preferred form at least 60% by weight, and in general at most 90% by weight, preferably at most 80% by weight and in particularly preferred form at most 75% by weight, of $C_1$-$C_{24}$-alkyl esters of acrylic acid and/or methacrylic acid (monomers I) in copolymerized form, based on the total weight of the monomers.

According to the invention, the polymers of the capsule wall generally comprise at least 10% by weight, preferably at least 15% by weight, preferably at least 20% by weight, and in general at most 50% by weight, preferably at most 40% by weight and in particularly preferred form at most 30% by weight, of one or more polyvinyl monomers (monomers II) in copolymerized form, based on the total weight of the monomers.

According to a further preferred embodiment, the polymers of the capsule wall comprise at least 20% by weight, preferably at least 25% by weight, preferably at least 30% by weight, and in general at most 50% by weight, preferably at most 45% by weight, of one or more polyvinyl monomers (monomers II) in copolymerized form, based on the total weight of the monomers.

In addition, the polymers can comprise up to 30% by weight, preferably up to 20% by weight, in particular up to 10% by weight, particularly preferably 1 to 5% by weight, of one or more monounsaturated, nonionizable monomers (monomer III), which are different from the monomers I, in copolymerized form, based on the total weight of the monomers.

Preference is given to microcapsules whose capsule wall is constructed from 60 to 85% by weight of one or more $C_1$-$C_{24}$-alkyl esters of acrylic acid and/or methacrylic acid (monomers I), 15 to 40% by weight of one or more polyvinyl monomers (monomers II), and 0 to 30% by weight of one or more monounsaturated, nonionizable monomers (monomer III), which are different from the monomers I, in each case based on the total weight of the monomers.

Further preference is given to microcapsules whose capsule wall is constructed from 50 to 70% by weight of one or more $C_1$-$C_{24}$-alkyl esters of acrylic acid and/or methacrylic acid (monomers I), 30 to 50% by weight of one or more polyvinyl monomers (monomers II), and 0 to 30% by weight of one or more monounsaturated, nonionizable monomers (monomer III), which are different from the monomers I, in each case based on the total weight of the monomers.

Preferably, the capsule wall is constructed only from monomers of groups I and II.

Suitable monomers I are $C_1$-$C_{24}$-alkyl esters of acrylic acid and/or methacrylic acid.

Preferred monomers I are methyl acrylate, ethyl acrylate, n-propyl acrylate and n-butyl acrylate, and also the corresponding methacrylates. Particular preference is given to isopropyl acrylate, isobutyl acrylate, sec-butyl acrylate and tert-butyl acrylate, and also isopropyl methacrylate, isobutyl methacrylate, sec-butyl methacrylate and tert-butyl methacrylate. In general, the methacrylates are preferred.

Preferred polyvinyl monomers are the polyesters of polyols with acrylic acid and/or methacrylic acid, also the polyallyl and polyvinyl ethers of these polyols. Preference is given to polyvinyl monomers with three and/or four free-radically polymerizable double bonds. Preference is given to trimethylolpropane triacrylate and trimethacrylate, pentaerythritol triallyl ether, pentaerythritol tetraallyl ether, pentaerythritol triacrylate and pentaerythritol tetraacrylate, and their technical-grade mixtures. Thus, pentaerythritol tetraacrylate is generally present in technical-grade mixtures in a mixture with pentaerythritol triacrylate and minor amounts of oligomerization products.

Suitable monomers III are monounsaturated, nonionizable monomers (monomer III), which are different from the monomers I, such as vinyl acetate, vinyl propionate, vinylpyridine, styrene or α-methylstyrene.

The microcapsules according to the invention can be prepared by a so-called in-situ polymerization. The principle of microcapsule formation is based on the fact that the monomers, free-radical initiator, protective colloid and the lipophilic substance to be encapsulated are used to prepare an oil-in-water emulsion in which the monomers and the lipophilic substance are present as disperse phase. According to one embodiment, it is possible to only add the free-radical initiator after dispersion. The polymerization of the monomers is then triggered by heating and, if appropriate, it is controlled by further increasing the temperature, and the polymers that are produced form the capsule wall which surrounds the lipophilic substance. This general principle is described, for example, in DE-A-10 139 171, to the contents of which reference is expressly made.

As a rule, the microcapsules are prepared in the presence of at least one organic and/or inorganic protective colloid. Both organic and inorganic protective colloids may be ionic or neutral. Protective colloids can be used here either individually or else in mixtures of two or more identically or differently charged protective colloids. Preferably, the microcapsules are prepared in the presence of an inorganic protective colloid, in particular in combination with an organic protective colloid.

Organic protective colloids are preferably water-soluble polymers which lower the surface tension of the water from 73 mN/m maximum to 45 to 70 mN/m and thus ensure the formation of closed capsule walls and also form microcapsules with preferred particle sizes in the range from 0.5 to 50 μm, preferably 0.5 to 30 μm, in particular 0.5 to 10 μm.

Organic anionic protective colloids are sodium alginate, polymethacrylic acid and its copolymers, the copolymers of sulfoethyl acrylate and methacrylate, sulfopropyl acrylate and methacrylate, of N-(sulfoethyl)maleimide, of 2-acrylamido-2-alkylsulfonic acids, styrenesulfonic acid and vinylsulfonic acid. Preferred organically anionic protective colloids are naphthalenesulfonic acid and naphthalenesulfonic acid-formaldehyde condensates, and in particular polyacrylic acids and phenolsulfonic acid-formaldehyde condensates.

Organic neutral protective colloids are, for example, cellulose derivatives, such as hydroxyethylcellulose, methylhydroxyethylcellulose, methylcellulose and carboxymethylcellulose, polyvinylpyrrolidone, copolymers of vinylpyrrolidone, gelatin, gum arabic, xanthan, casein, polyethylene glycols, polyvinyl alcohol and partially hydrolyzed polyvinyl acetates, and also methylhydroxypropylcellulose. Preferred organic neutral protective colloids are polyvinyl alcohol and partially hydrolyzed polyvinyl acetates, and also methylhydroxy($C_1$-$C_4$)-alkylcellulose.

According to the present invention, a combination of an $SiO_2$-based protective colloid and a methylhydroxy($C_1$-$C_4$)-alkylcellulose is preferably used. It has been found that the combination with a low molecular weight methylhydroxy($C_1$-$C_4$)-alkylcellulose leads to advantageous properties. According to the invention, a methylhydroxy($C_1$-$C_4$)-alkylcellulose with an average molecular weight (weight-average) of ≦50 000 g/mol, preferably from the range from 5000 to 50 000 g/mol, preferably from 10 000 to 35 000 g/mol, in particular 20 000 to 30 000 g/mol, is used.

Methylhydroxy($C_1$-$C_4$)-alkylcellulose is to be understood as meaning methylhydroxy-($C_1$-$C_4$)-alkylcellulose with highly diverse degrees of methylation and also degrees of alkoxylation.

Methylhydroxy($C_1$-$C_4$)-alkylcelluloses are prepared in a known manner by two reaction steps. In one step, the alkoxylation of cellulose with alkylene oxides takes place. In the second step, the methylation of hydroxyl groups that are present takes place with a methyl halide. These two reactions generally take place in succession, but can also be carried out simultaneously. Depending on the stoichiometry of the employed alkylene oxides and alkylating agents relative to the cellulose, the degree of substitution of the cellulose varies. The average degree of substitution (DS) indicates how many hydroxyl units have on average been etherified on to one dehydroglucose unit and can be from 0 to 3. The molar degree of substitution (MS) indicates the average number of alkoxy units per dehydroglucose unit and may also be greater than 3 as a result of the formation of side chains during the alkoxylation.

The preferred methylhydroxy($C_1$-$C_4$)-alkylcelluloses have an average degree of substitution DS of from 1.1 to 2.5 and a molar degree of substitution MS of from 0.03 to 0.9.

Suitable methylhydroxy($C_1$-$C_4$)-alkylcelluloses are, for example, methylhydroxy-ethylcellulose or methylhydroxypropylcellulose. Particular preference is given to methylhydroxypropylcellulose. Methylhydroxy($C_1$-$C_4$)-alkylcelluloses of this type are available, for example, under the trade names Culminal® from Hercules/Aqualon.

Preferably, the microcapsules are prepared by preparing an oil-in-water emulsion comprising, as essential constituents, the monomers, free-radical initiator, inorganic protective colloid and the lipophilic substance to be encapsulated, and triggering the polymerization. If appropriate, the polymerization is controlled by increasing the temperature, where the polymers that are produced form the capsule wall which surrounds the lipophilic substance.

The inorganic protective colloid is preferably inorganic solid particles so-called Pickering systems. Such a Pickering system can consist here of the solid particles on their own or additionally of auxiliaries which improve the dispersibility of the particles in water or the wettability of the particles by the lipophilic phase. The mode of action and its use is described in EP-A-1 029 018 and EP-A-1 321 182, to the contents of which reference is expressly made.

The inorganic solid particles may be metal salts, such as salts, oxides and hydroxides of calcium, magnesium, iron, zinc, nickel, titanium, aluminum, silicon, barium and manganese. Mention is to be made of magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide. Silicates, bentonite, hydroxyapatite and hydrotalcites may likewise be mentioned. Particular preference is given to $SiO_2$-based silicas, magnesium pyrophosphate and tricalcium phosphate.

Suitable $SiO_2$-based protective colloids are highly disperse silicas. They can be dispersed in water as fine, solid particles. However, it is also possible to use so-called colloidal dispersions of silica in water. Such colloidal dispersions are alkaline, aqueous mixtures of silica. In the alkaline pH range, the particles are swollen and stable in water. For a use of these dispersions as protective colloid it is advantageous if the pH of the oil-in-water emulsion is adjusted to pH 2 to 7 using an acid. Preferred colloidal dispersions of silica have a specific surface area in the range from 70 to 90 $m^2/g$ at pH 9.3.

Preferred $SiO_2$-based protective colloids are highly disperse silicas whose average particle sizes are in the range from 40 to 150 nm at pH values in the range from 8-11. By way of example, mention may be made of Levasil® 50/50 (H. C. Starck), Köstrosol® 3550 (CWK Bad Köstritz), and Bindzil® 50/80 (Akzo Nobel Chemicals).

According to one preferred embodiment, a combination of an $SiO_2$-based protective colloid and a methylhydroxy($C_1$-$C_4$)-alkylcellulose is used. In this connection, it has been found that the combination with a low molecular weight methylhydroxy($C_1$-$C_4$)-alkylcellulose leads to advantageous properties. According to the invention, a methylhydroxy($C_1$-$C_4$)-alkylcellulose with an average molecular weight (weight-average) of $\leq$50 000 g/mol, preferably from the range from 5000 to 50 000 g/mol, preferably from 10 000 to 35 000 g/mol, in particular 20 000 to 30 000 g/mol, is used.

In general, the protective colloids are used in amounts of from 0.1 to 20% by weight, preferably 0.1 to 15, preferably from 0.5 to 10% by weight, based on the water phase.

For inorganic protective colloids, preferably amounts of from 0.5 to 15% by weight, preferably 5-15% by weight, based on the water phase, are selected here.

Organic protective colloids are preferably used in amounts of from 0.1 to 10% by weight, based on the water phase of the emulsion. The methylhydroxy($C_1$-$C_4$)-alkylcellulose used according to one preferred embodiment is used here preferably in an amount of from 0.5% by weight to 1.5% by weight, in particular from 0.6% by weight to 0.8% by weight, based on the $SiO_2$-based protective colloid.

According to a further preferred embodiment, the $SiO_2$-based protective colloid is preferably used in combination with an amount of from 0.2% by weight to 0.65% by weight, in particular from 0.3% by weight to 0.6% by weight, of methylhydroxy($C_1$-$C_4$)-alkylcellulose, based on the $SiO_2$-based protective colloid.

Free-radical initiators which can be used for the free-radical polymerization reaction are the customary oil-soluble peroxo and azo compounds, expediently in amounts of from 0.2 to 5% by weight, based on the weight of the monomers. In this connection, oil-soluble is to be understood as meaning that the free-radical initiator is a constituent of the oil phase in the oil-in-water emulsion where it triggers the polymerization.

Depending on the state of aggregation of the free-radical initiator and its solubility behavior, it can be introduced as such, but preferably as solution, emulsion or suspension, through which in particular small quantitative amounts of free-radical initiator can be dosed more precisely.

Preferred free-radical initiators to be mentioned are tert-butyl peroxoneodecanoate, tert-amyl peroxypivalate, dilauroyl peroxide, tert-amyl peroxy-2-ethylhexanoate, 2,2'-azobis(2,4-dimethyl)valeronitrile, 2,2'-azobis(2-methylbutyronitrile), dibenzoyl peroxide, tert-butyl per-2-ethylhexanoate, di-tert.-butyl peroxide, 2,5-dimethyl-2,5-di-(tert-butylperoxy)hexane and cumene hydroperoxide.

Particularly preferred free-radical initiators are di(3,5,5-trimethylhexanoyl) peroxide, 4,4'-azobisisobutyronitrile, tert-butyl perpivalate, dilauroyl peroxide, tert-butyl peroxoneodecanoate and dimethyl-2,2-azobisisobutyrate. These have a half-life of 10 hours in a temperature range from 30 to 100° C.

Furthermore, it is possible to add regulators known to the person skilled in the art in customary amounts to the polymerization, such as tert-dodecyl mercaptan or ethylhexyl thioglycolate.

As a rule, the polymerization is carried out at 20 to 100° C., preferably at 40 to 95° C. Depending on the desired lipophilic substance, the oil-in-water emulsion is to be formed at a temperature at which the core material is liquid/oily. Accordingly, it is necessary to select a free-radical initiator whose decomposition temperature is above this temperature, and likewise to carry out the polymerization at 2 to 50° C. above this temperature, and so, if appropriate, free-radical initiators are selected whose decomposition temperature is above the melting point of the lipophilic substance.

A customary process variant for lipophilic substances with a melting point up to about 60° C. is a reaction temperature starting at 60° C. which is increased to 85° C. in the course of the reaction. Advantageously free-radical initiators have a 10 hour half-life in the range from 45 to 65° C., such as t-butyl perpivalate.

According to a further process variant for lipophilic substances with a melting point above 60° C., a temperature program is selected which starts at correspondingly higher reaction temperatures. For starting temperatures around 85° C., preference is given to free-radical initiators with a 10 hour half-life in the range from 70 to 90° C., such as t-butyl per-2-ethylhexanoate.

The polymerization is expediently carried out at atmospheric pressure, although it is also possible to work at reduced or slightly increased pressure, for example at a polymerization temperature above 100° C., thus about in the range from 0.5 to 5 bar.

The reaction times for the polymerization are normally 1 to 10 hours, in most cases 2 to 5 hours.

After the actual polymerization reaction, for a conversion of 90 to 99% by weight, it is generally advantageous to arrange for the aqueous microcapsule dispersions to be largely free from odor carriers, such as residual monomers and other volatile organic constituents. This can be achieved in a manner known per se by physical means through distillative removal (in particular via steam distillation) or by stripping off with an inert gas. In addition, it can take place by chemical means, as described in WO 99/24525, advantageously by redox-initiated polymerization, as described in DE-A 44 35 423, DE-A 44 19 518 and DE-A 44 35 422.

Moreover, in order to reduce the residual monomer content, according to one embodiment, the renewed addition of a free-radical initiator is required, which defines the start of the afterpolymerization. According to one preferred embodiment, after the capsule formation, an afterpolymerization is triggered with salts of peroxodisulfuric acid as free-radical initiator.

Suitable salts are in particular ammonium, sodium and potassium peroxodisulfuric acid.

The alkali metal salts of peroxodisulfuric acid are water-soluble and initiate the afterpolymerization in and/or from the water phase. The salts of peroxodisulfuric acid are expediently used in amounts of from 0.2 to 5% by weight, based on the weight of the monomers. Here, it is possible to meter them in all at once or over a certain period.

The temperature for the afterpolymerization is usually 60 to 100° C. The afterpolymerization time is generally 0.5 to 5 hours.

According to this preferred embodiment with an afterpolymerization with one or more salts of peroxodisulfuric acid as free-radical initiator, particularly low-odor microcapsules are obtained.

If required, the afterpolymerization can also be carried out at even lower temperatures by adding reducing agents such as sodium bisulfite. The addition of reducing agents can further reduce the residual monomer content.

Compared with customary afterpolymerization initiators consisting of organic, water-soluble peroxo or azo compounds such as tert-butyl hydroperoxide, the rate of decomposition of which can, if necessary, be increased by adding a reducing agent such as ascorbic acid, the salts of peroxodisulfuric acid exhibit in the end product significantly lower amounts of odor carriers such as, for example, aldehydes.

In this way, it is possible to prepare microcapsules with an average particle size in the range from 0.5 to 100 µm, it being possible to adjust the particle size in a manner known per se via the shear force, the stirring speed, and its concentration. Preference is given to microcapsules with an average particle size in the range from 0.5 to 50 µm, preferably 0.5 to 30 µm, in particular 3 to 10 µm, in particular 3 to 7 µm (centrifugal average by means of light scattering).

The microcapsules according to the invention are suitable, depending on the lipophilic substance, for copy paper, in cosmetics, for the encapsulation of adhesives, adhesive components, fragrances, catalysts or in crop protection or generally for the encapsulation of biocides, active ingredients and effect substances. The microcapsules according to the invention are particularly suitable for latent heat storage materials.

In accordance with the definition, latent heat storage materials are substances which have a phase transition in the temperature range in which a heat transfer is to be carried out. The lipophilic substance preferably has a solid/liquid phase transition in the temperature range from −20 to 120° C.

Examples of suitable substances are:
aliphatic hydrocarbon compounds such as saturated or unsaturated $C_{10}$-$C_{40}$-hydrocarbons, which are branched or preferably linear, such as n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, and cyclic hydrocarbons, e.g. cyclohexane, cyclooctane, cyclodecane;

aromatic hydrocarbon compounds, such as benzene, napthalene, biphenyl, o- or n-terphenyl, $C_1$-$C_{40}$-alkyl-substituted aromatic hydrocarbons such as dodecylbenzene, tetradecylbenzene, hexadecylbenzene, hexylnaphthalene or decylnaphthalene;

saturated or unsaturated $C_6$-$C_{30}$-fatty acids, such as lauric acid, stearic acid, oleic acid or behenic acid, preferably eutectic mixtures of decanoic acid with e.g. myristic acid, palmitic acid or lauric acid;

fatty alcohols such as lauryl alcohol, stearyl alcohol, oleyl alcohol, myristyl alcohol, cetyl alcohol, mixtures such as coconut fatty alcohol, and the so-called oxo alcohols, which are obtained by hydroformylation of α-olefins and further reactions;

$C_6$-$C_{30}$-fatty amines, such as decylamine, dodecylamine, tetradecylamine or hexadecylamine;

esters such as $C_1$-$C_{10}$-alkyl esters of fatty acids such as propyl palmitate, methyl stearate or methyl palmitate, and preferably their eutectic mixtures or methyl cinnamate;

natural and synthetic waxes such as montanic acid waxes, montan ester waxes, carnauba wax, polyethylene wax, oxidized waxes, polyvinyl ether wax, ethylene vinyl acetate wax or hard waxes according to Fischer-Tropsch processes;

halogenated hydrocarbons such as chloroparaffin, bromooctadecane, bromopentadecane, bromononadecane, bromoeicosane, bromodocosane.

Furthermore, mixtures of these substances are suitable provided this does not result in a reduction in the melting point to outside of the desired range, or the heat of melting of the mixture does not become too low for a useful application.

For example, the use of pure n-alkanes, n-alkanes with a purity greater than 80% or alkane mixtures, as are produced as technical-grade distillate and are commercially available as such, is advantageous.

Furthermore, it may be advantageous to add to the lipophilic substances compounds that are soluble therein in order, in so doing, to prevent the crystallization delay which sometimes arises in the case of nonpolar substances. As described in U.S. Pat. No. 5,456,852, compounds with a melting point that is 20 to 120 K higher than that of the actual core substance are advantageously used. Suitable compounds are the fatty acids, fatty alcohols, fatty amides and aliphatic hydrocarbon compounds mentioned above as lipophilic substances. They are added in amounts of from 0.1 to 10% by weight, based on the capsule core.

The latent heat storage materials are selected depending on the temperature range in which the heat storage media are desired. For example, for heat storage media in construction materials in a moderate climate, preference is given to using latent heat storage materials whose solid/liquid phase transition is in the temperature range from 0 to 60° C. Thus, for interior applications, individual materials or mixtures with conversion temperatures of from 15 to 30° C. are usually selected. In the case of solar applications as storage medium or for avoiding the overheating of transparent thermal insulation, as described in EP-A-333 145, conversion temperatures of 30-60° C. are especially suitable. For applications in the textile sector, conversion temperatures of from 0 to 40° C. are especially advantageous, and for heat transfer liquids, those from −10 to 120° C.

Preferred latent heat storage materials are aliphatic hydrocarbons, particularly preferably those listed above by way of example. Particular preference is given to aliphatic hydrocarbons having 14 to 20 carbon atoms, and mixtures thereof.

The microcapsules according to the invention can be processed directly as aqueous microcapsule dispersion or in the form of a powder. The microcapsules according to the invention can, if appropriate, then be isolated by spray-drying.

The spray-drying of the microcapsule dispersion can take place in the customary manner. In general, the procedure is such that the inlet temperature of the stream of warm air is in the range from 100 to 200° C., preferably 120 to 160° C., and the outlet temperature of the stream of warm air is in the range from 30 to 90° C., preferably 60 to 80° C. The spraying of the aqueous polymer dispersion in the stream of warm air can take place, for example, by means of single-component or multiple-component nozzles or via a rotating disk. Deposition of the polymer powder normally takes place using cyclones or filter separators. The sprayed aqueous polymer dispersion and the stream of warm air are preferably conveyed in parallel.

If appropriate, for the spray-drying, spraying auxiliaries are added in order to facilitate the spray-drying, or to establish certain powder properties, e.g. low dust content, pourability or improved redispersibility. A large number of spraying auxiliaries is known to the person skilled in the art. Examples thereof can be found in DE-A 19629525, DE-A 19629526, DE-A 2214410, DE-A 2445813, EP-A 407889 or EP-A 784449. Advantageous spraying auxiliaries are, for example, water-soluble polymers of the polyvinyl alcohol type or partially hydrolyzed polyvinyl acetates, cellulose derivatives such as hydroxyethylcellulose, carboxymethylcellulose, methylcellulose, methylhydroxyethylcellulose and methylhydroxypropylcellulose, starch, polyvinylpyrrolidone, copolymers of vinylpyrrolidone, gelatin, preferably polyvinyl alcohol and partially hydrolyzed polyvinyl acetates, and methylhydroxypropylcellulose. Preference is given to working without the addition of spraying auxiliaries.

The application of the microcapsule powder according to the invention is diverse. A broad field of application is binding construction materials with mineral, silicatic or polymeric binders. A distinction is made here between moldings and coating compositions. Thus, they are characterized by their hydrolysis stability to the aqueous and often alkaline-aqueous materials.

A mineral molding is understood here as meaning a molding which is formed from a mixture of a mineral binder, water, aggregates, and, if appropriate, auxiliaries after shaping as a result of the mineral binder/water mixture hardening as a function of time, if appropriate under the action of elevated temperature. Mineral binders are generally known. These are finely divided inorganic substances such as lime, gypsum, clay, loam and/or cement or magnesia cement, which are converted to their ready-to-use form by stirring with water, the latter, when left by themselves, in the air or else underwater, if appropriate under the action of elevated temperature, solidifying in a stone-like manner as a function of time.

The aggregates generally consist of granular or fiber-like natural or synthetic stone (gravel, sand, glass fibers or mineral fibers), in special cases also of metals or organic aggregates or of mixtures of said aggregates, having particle sizes or fiber lengths which are adapted to the particular intended use in a manner known per se. Often, chromatic pigments are also co-used as aggregates for the purpose of imparting color.

Suitable auxiliaries are in particular those substances which accelerate or delay hardening or which influence the elasticity or porosity of the consolidated mineral molding. These are in particular polymers as are known, for example, from U.S. Pat. No. 4,340,510, GB patent 1 505 558, U.S. Pat. Nos. 3,196,122, 3,043,790, 3,239,479, DE-A 43 17 035, DE-A 43 17 036, JP-A 91/131 533 and other specifications.

The microcapsules according to the invention are suitable for the modification of mineral binding construction materials (mortar-like preparations) which comprise a mineral binder which consists of 70 to 100% by weight of cement and 0 to 30% by weight of gypsum. This is the case particularly if cement is the sole mineral binder. The effect according to the invention here is essentially independent of the type of cement. Depending on the project at hand, it is thus possible to use blast furnace cement, oil shale cement, Portland cement, hydrophobicized Portland cement, quick-setting cement, high expansion cement or high-alumina cement, the use of Portland cement proving to be particularly favorable. As regards further details, reference may be made to DE-A 196 23 413. Typically, the dry compositions of mineral binding construction materials comprise 0.1 to 50% by weight, preferably 5 to 40% by weight, particularly preferably 10 to 30% by weight of microcapsules, based on the amount of mineral binder.

The microcapsules according to the invention are preferably used as additive in mineral coating compositions such as plaster. A plaster of this kind for the interior sector is usually composed of gypsum as binder. As a rule, the gypsum/microcapsule weight ratio is from 95:5 to 70:30. Higher microcapsule fractions are of course possible.

Coatings for the exterior sector such as external facades or wet rooms can comprise cement (cement plasters), lime or waterglass (mineral or silicate plasters) or plastics dispersions (synthetic resin plasters) as binders together with fillers and, if appropriate, pigments for imparting color. The fraction of microcapsules in the overall solid corresponds to the weight ratios for gypsum plasters.

In addition, the microcapsules according to the invention are suitable as additive in polymeric moldings or polymeric coating compositions. These are to be understood as meaning thermoplastic and thermosetting polymers during whose processing the microcapsules are not destroyed. Examples are epoxy, urea, melamine, polyurethane and silicone resins and also coating materials, either solvent-based, high-solid-based, powder coating or water-based coating and dispersion films. The microcapsule powder is also suitable for incorporation into plastics foams and fibers. Examples of foams are polyrethane foam, polystyrene foam, latex foam and melamine resin foam.

Furthermore, the microcapsules according to the invention are suitable as additive in lignocellulose-containing moldings, such as chipboards, MDF and HDF boards, cork boards or OSBs, as described in WO2005/116559, to which reference is expressly made.

Advantageous effects can also be achieved when the microcapsules according to the invention are processed in mineral moldings which are foamed.

A particularly preferred embodiment for the incorporation of the microcapsules in mineral binders is the modification of gypsum construction boards or magnesia boards. Construction boards comprising the microcapsules according to the invention likewise form part of the present inventions.

Here, preferably 5 to 40% by weight, in particular 20 to 35% by weight, of microcapsule powders are incorporated, based on the total weight of the construction board, in particular gypsum construction board (dry substance). The preparation of gypsum construction boards containing microencapsulated latent heat storage materials is generally known and is described in EP-A 1 421 243, to which reference is expressly made. They are usually produced by introducing aqueous gypsum slurry, discontinuously or preferably continuously, between two covering layers, such as cardboard sheets based on cellulose or glass fiber nonwoven, to form boards. The gypsum slurry is prepared by continually adding and constantly mixing β-hemihydrate calcium sulfate in water with additives. The microcapsules can be metered together with the calcium sulfate, or they may already be in the form of an aqueous dispersion. The gypsum slurry obtained in this way is applied to the covering layer, for example sprayed on, and covered with the second covering layer. As curing commences, the construction boards are shaped in a press to give strips. These strips harden over the course of a few minutes and are cut into boards. At this stage, the boards generally still comprise one third of their weight as free water. In order to remove the residual water, the boards are subjected to a heat treatment at temperatures up to 250° C. The gypsum construction boards obtained in this way have a density of 750-950 kg/m$^3$. In this connection, instead of the customarily used cardboard based on cellulose, it is also possible to use alternative, fibrous structures as coverings for both sides of the "gypsum construction board". Alternative materials are polymer fibers of e.g. polypropylene, polyester, polyamide, polyacrylates, polyacrylonitrile and the like. Glass fibers are also suitable. The alternative materials can be used as wovens and as so-called nonwovens, i.e. as web-like structure, for example glass fiber web. Construction boards of this type are known, for example, from U.S. Pat. Nos. 4,810,569, 4,195,110 and 4,394,411. Preference is given to gypsum construction boards with a covering on both sides made of glass fiber web comprising the microcapsules according to the invention. Further alternative covering materials are aluminum-lined cartons, films and papers, plastic film lined papers and the like. These can be used on one or both sides. It is also possible to laminate further such covering layers subsequently onto a firstly applied covering layer. In this connection, for example, gluing/adhesion processes and sealing processes can be used.

When incorporated into the gypsum construction board, the microcapsules according to the invention exhibit good tightnesses even over a prolonger period and even at relatively low temperatures. Moreover, electron micrographs in the edge region of gypsum construction boards, that is subject to particular mechanical and thermal stress, exhibit less destruction of the capsules than the microcapsules used according to DE-A-101 39 171. Furthermore, the new gypsum construction boards are low-odor and are characterized by low emission values for moderately and difficultly volatile compounds, SVOC (semivolatile organic compound) and TVOC (total volatile organic compound).

Furthermore, the microcapsules according to the invention are advantageously suitable for modifying fibers and textile articles, for example textile wovens and nonwovens (e.g. batts) etc. Application forms to be mentioned here are in particular microcapsule coatings, foams containing microcapsules and microcapsule-modified textile fibers. For coatings, the microcapsules are applied together with a polymeric binder and, if appropriate, other auxiliaries, generally in the form of the dispersion, to a textile product. Customary textile binders are film-forming polymers with a glass transition temperature in the range from −45 to 45° C., preferably −30 to 12° C. The preparation of such microcapsule coatings is described, for example, in WO 95/34609, to which reference is expressly made. The modification of foams containing microcapsules takes place in a similar manner, as described in DE 981576T and U.S. Pat. No. 5,955,188. The prefoamed substrate, preferably a polyurethane or polyether, is surface-treated with a binder-containing microcapsule dispersion. Then, by applying a vacuum, the binder/microcapsule mixture enters the open-pored foam structure in which the binder cures and binds the microcapsules to the substrate. A further processing option is the modification of the textile fibers themselves, e.g. by spinning from a melt or an aqueous dispersion, as described in U.S. 2002/0054964. Melt spinning processes are used here for nylon fibers, polyester fibers, polypropylene fibers and similar fibers whereas the wet spinning process is used primarily for producing acrylic fibers.

The microcapsules according to the invention are also suitable for producing heat transfer liquid. Within the context of this application, the term heat transfer liquid is understood as meaning both liquids for heat transport and also liquids for cold transport, i.e. cooling liquids. The principle of the transfer of heat energy is identical in both cases and differs merely in the direction of transfer.

The examples below are intended to illustrate the invention. Unless stated otherwise, the percentages in the examples are percentages by weight.

The particle size of the microcapsule dispersion was determined using a Malvern Particle Sizer model 3600E or a Malvern Mastersizer 2000 in accordance with a standard measuring method documented in the literature. The D[v, 0.1] value means that 10% of the particles have a particle size (in accordance with the volume average) up to this value. Accordingly, D[v, 0.5] means that 50% of the particles and D[v, 0.9], means that 90% of the particles have a particle size (according to the volume average) less than/equal to this value. The span value arises from the quotient from the difference D[v, 0.9]−D[v, 0.1] and D[v, 0.5].

Determination of the Evaporation Rate (ER) at 180° C.

For the pretreatment, 2 g of the microcapsule dispersion were dried in a small metal dish at 105° C. for two hours in order to remove any residual water. The weight ($m_0$) was then determined. After heating for one hour at 180° C. and cooling, the weight ($m_1$) was determined. The weight difference ($m_0$-$m_1$), based on $m_0$ and multiplied by 100 gives the evaporation rate in %. The lower the value, the tighter the microcapsules. It must be ensured here that comparisons in the evaporation rate should always be carried out on comparable capsule sizes and stabilizer systems.

Determination of the Evaporation Rate (ER) at 95° C.

For the pretreatment, 2 g of the microcapsule dispersion were dried in a small metal dish at 105° C. for two hours in order to remove any residual water. The weight ($m_0$) was then determined. After heating at 95° C. for 24 hours and cooling, the weight ($m_1$) was determined. The weight difference ($m_0$-$m_1$) based on mo and multiplied by 100 gives the evaporation rate in %. The lower the value, the tighter the microcapsules. It is to be ensured here that comparisons in the evaporation rate should always be carried out on comparable capsule sizes and stabilizer systems.

Determination of the TVOC/SVOC Values Using "Field and Laboratory Emission Cell" Measurement (FLEC Measurement)

The emission of VOC (volatile organic compounds) from gypsum boards is ascertained following defined storage with the help of a FLEC measurement and determined by a GC/MS system qualitatively and quantitatively in accordance with DIN ISO 16000-6, DIN ISO 16000-10 and DIN ISO 16017-1. During the course of measurement, the gypsum board is conditioned in a metal frame (internal dimensions: 10.5×14.0×1.5 cm) including base plate initially for 24 hours at 30° C. in a drying cabinet (Heraeus T 5042 EK). The board with frame and base plate is then placed in a drying cabinet with gas sampler (Desaga GS 312) and temperature measurement unit, and 10 l of prepurified air are allowed to flow over the board in a laminar manner via a FLEC attachment with seal lying on the frame. The exit air is conveyed via an adsorption tube filled with Tenax TA. The VOC emitted from the board are then thermally desorbed from the Tenax tubes (Thermodesorber: Turbomatrix ATD from Perkin Elmer with GC 6890 and MS 5973 from Agilent or Thermodesorber TD20 with GC/MS-QP 2010 S from Shimadzu) and analyzed on a gas chromatograph, as known to the person skilled in the art.

Production of the Gypsum Board for the FLEC Measurement 217.0 g of plaster of Paris, 0.34 g of accelerator and 1.7 g of starch were mixed and scattered in ca. 15 seconds onto the surface of an aqueous phase of 109.4 g of water, 203.0 g of microcapsule dispersion of the respective example (solids content ~42% by weight), 1.7 g of liquefier and 0.2 g of Tego Foamex 1488. A snow broom was then used to mix for a further 30 seconds so that the gypsum slurry mixture was produced in a total of 45 seconds. The gypsum slurry was poured into a metal frame (internal dimension 10.5×14) (a glass web was placed beforehand on the base of the metal frame) smoothed out, a glass web is placed on the surface, and pressed with a rolling pin. After 30 minutes at room temperature, the board was dried in a fume cupboard for 30 minutes at 170° C. and for one hour at 105° C. The board was then post-dried for ca. 15 hours at 40° C.

Preparation of the Microcapsule Dispersion

EXAMPLE 1

Water Phase:
680 g of water
110 g of a 50% strength by weight silica sol (specific surface area ca. 80 m²/g)
8 g of a 5% strength by weight aqueous solution of methylhydroxypropyl-cellulose with an average molecular weight of 26 000 g/mol
2.1 g of a 2.5% strength by weight aqueous sodium nitrite solution
4.0 g of a 20% strength by weight nitric acid solution in water
Oil Phase
308.0 g of a mixture of essentially linear paraffins with a melting point of ca. 26° C.
123.2 g of hexadecane (technical-grade)
8.8 g of a technical-grade paraffin with a melting point of ca. 65° C.
66.0 g of methyl methacrylate
44.0 g of pentaerythritol tetraacrylate (technical-grade, Cytec)
Addition 1
0.92 g of a 75% strength solution of t-butyl perpivalate in aliphatic hydrocarbons
Feed 1:
22.0 g of a 5% strength by weight aqueous Na peroxodisulfate solution
30.0 g of water The water phase was initially introduced at 40° C.; the molten and homogeneously mixed oil phase was added to this and the mixture was dispersed for 40 minutes in a high-speed dissolver stirrer (disk diameter 5 cm) at 3500 rpm. Addition 1 was added. The emulsion was heated with stirring using an anchor stirrer over 60 minutes to 70° C., over the course of a further 60 minutes to 90° C. and held for 60 minutes at 90° C. With stirring, feed 1 was metered in to the resulting microcapsule dispersion over 90 minutes at 90° C. and then the mixture was stirred for 2 hours at this temperature. It was then cooled to room temperature and neutralized with aqueous sodium hydroxide solution. A microcapsule dispersion with an average particle size of 7.2 μm and a solids content of 43.6% was obtained.
The evaporation rate at 180° C. (1 h) was 11.5%.
The evaporation rate at 95° C. (24 h) was 0.2%.
By adding thickeners after cooling to room temperature, it is possible to prevent creaming in a manner known per se.

EXAMPLE 2

The procedure was analogous to example 1, except the oil phase consisted of the following components:
Oil Phase
308.0 g of a mixture of essentially linear paraffins with a melting point of ca. 26° C.
123.2 g of hexadecane (technical-grade)
8.8 g of a technical-grade paraffin with a melting point of ca. 65° C.
99.0 g of methyl methacrylate
11.0g of pentaerythritol tetraacrylate (technical-grade, Cytec)
A microcapsule dispersion with an average particle size of 5.7 μm and a solids content of 43.2% was obtained.
The evaporation rate at 180° C. (1 h) was 45.8%.
The evaporation rate at 95° C. (24 h) was 0.3%.

EXAMPLE 3

The procedure was analogous to example 1 except the oil phase consisted of the following components:
Oil Phase
321.2 g of a mixture of essentially linear paraffins with a melting point of ca. 26° C.
110.0 g of hexadecane (technical-grade)
9 g of a technical-grade paraffin with a melting point of ca. 65° C.
82.5 g of methyl methacrylate
27.5 g of pentaerythritol tetraacrylate (technical-grade, Cytec)
A microcapsule dispersion with an average particle size of 0.7 μm and a solids content of 43.3% was obtained.
The evaporation rate at 180° C. (1 h) was 16.5%.
The evaporation rate at 95° C. (24 h) was 0.7%.

COMPARATIVE EXAMPLE 4

Not According to the Invention

The procedure was analogous to example 1 except the oil phase consisted of the following components:
Oil Phase
321.2 g of a mixture of essentially linear paraffins with a melting point of ca. 26° C.
110.0 g of hexadecane (technical-grade)
9 g of a technical-grade paraffin with a melting point of ca. 65° C.
82.5 g of methyl methacrylate
27.5 g of butanediol diacrylate
A microcapsule dispersion with an average particle size of 6.5 μm and a solids content of 42.5% was obtained.
The evaporation rate at 180° C. (1 h) was >60%.
The evaporation rate at 95° C. (24 h) was 1.5%.
SVOC from gypsum board: 270 μg/m³

EXAMPLE 5

The procedure was analogous to example 3 except, after cooling to room temperature, 33.44 g of a 50% strength aqueous solution of starch 019S1 and 27.63 g of a 26% strength aqueous solution of Densodrin BA were added to the microcapsule dispersion. The dispersion was then rendered pH neutral and mixed with 0.6% Viscalex HV 30.

A microcapsule dispersion with an average particle size of 7.2 μm and a solid content of 42.7% was obtained.
The evaporation rate at 180° C. (1 h) was 15.1%
SVOC from gypsum board: 710 μg/m$^3$

EXAMPLE 6

The procedure was analogous to example 1 except the water phase and oil phase had the following compositions:
Water Phase:
680 g of water
165 g of a 50% strength by weight silica sol (specific surface area ca. 80 m$^2$/g)
8 g of a 5% strength by weight aqueous solution of methyl-hydroxy-propylcellulose with an average molecular weight of 26000 g/mol
2.1 g of a 2.5% strength by weight aqueous sodium nitrite solution
4.0 g of a 20% strength by weight nitric acid solution in water
Oil Phase
321.0 g of a mixture of essentially linear paraffins with a melting point of ca. 26° C.
110.0 g of hexadecane (technical-grade)
8.8 g of a technical-grade paraffin with a melting point of ca. 65° C.
66.0 g of methyl methacrylate
44.0 g of pentaerythritol tetraacrylate (technical-grade, Cytec)

As addition 1, 1.5 g of a 75% strength by weight solution of t-butyl perpivalate in aliphatic hydrocarbons were added. After cooling, the microcapsule dispersion was firstly neutralized and then mixed with 1% by weight of Sokalan AT 120. A microcapsule dispersion with an average particle of 5.0 μm and a solids content of 43.4% was obtained.
The evaporation rate at 180° C. (1 h) was 47.1%.
SVOC from gypsum board: 60 μg/m$^3$

EXAMPLE 7

The procedure was analogous to example 1 except that the water phase and oil phase had the following compositions:
Water Phase:
680 g of water
121 g of a 50% strength by weight silica sol (specific surface area ca. 80 m$^2$/g)
8 g of a 5% strength by weight aqueous solution of methyl-hydroxy-propylcellulose with an average molecular weight of 26000 g/mol
2.1 g of a 2.5% strength by weight aqueous sodium nitrite solution
4.0 g of a 20% strength by weight nitric acid solution in water
Oil Phase
337.3 g of a mixture of essentially linear paraffins with a melting point of ca. 26° C.
115.5 g of hexadecane (technical-grade)
9.24 g of a technical-grade paraffin with a melting point of ca. 65° C.
52.8 g of methyl methacrylate
35.2 g of pentaerythritol tetraacrylate (technical-grade, Cytec)

A microcapsule dispersion with an average particle of 6.2 μm and a solids content of 44.3% was obtained.
The evaporation rate at 180° C. (1 h) was >60%.
SVOC from gypsum board: 440 μg/m$^3$

EXAMPLE 8

The procedure was analogous to example 1 except the water phase and oil phase had the following compositions:
Water Phase:
680 g of water
137.5 g of a 50% strength by weight silica sol (specific surface area ca. 80 m$^2$/g)
8 g of a 5% strength by weight aqueous solution of methyl-hydroxy-propylcellulose with an average molecular weight of 26000 g/mol
2.1 g of a 2.5% strength by weight aqueous sodium nitrite solution
3.8 g of a 20% strength by weight nitric acid solution in water
Oil Phase
321.0 g of a mixture of essentially linear paraffins with a melting point of ca. 26° C.
110.0 g of hexadecane (technical-grade)
8.8 g of a technical-grade paraffin with a melting point of ca. 65° C.
66.0 g of methyl methacrylate
44.0 g of pentaerythritol tetraacrylate (technical-grade, Cytec)
A microcapsule dispersion with an average particle size of 5.2 μm and a solids content of 43.2% was obtained.
The evaporation rate at 180° C. (1 h) was 60.3%.
SVOC from gypsum board: 180 μg/m$^3$

EXAMPLE 9

The procedure was analogous to example 1 except the water phase and oil phase had the following compositions:
Water Phase:
680 g of water
192.5 g of a 50% strength by weight silica sol (specific surface area ca. 80 m$^2$/g)
8 g of a 5% strength by weight aqueous solution of methyl-hydroxy-propylcellulose with an average molecular weight of 26000 g/mol
2.1 g of a 2.5% strength by weight aqueous sodium nitrite solution
4.5 g of a 20% strength by weight nitric acid solution in water
Oil Phase
321.0 g of a mixture of essentially linear paraffins with a melting point of ca. 26° C.
110.0 g of hexadecane (technical-grade)
8.8 g of a technical-grade paraffin with a melting point of ca. 65° C.
82.5 g of methyl methacrylate
27.5 g of pentaerythritol tetraacrylate (technical-grade, Cytec)
A microcapsule dispersion with an average particle size of 3.4 μm and a solids content of 43.7% was obtained.
The evaporation rate at 180° C. (1 h) was 58.4%.
SVOC from gypsum board: 570 μg/m$^3$

The invention claimed is:
1. A microcapsule, comprising:
   a capsule core; and
   a capsule wall;
   wherein the capsule wall is a copolymer of copolymerized monomers, consisting of:
   (a) 50 to 90% by weight of at least one selected from the group consisting of a $C_1$-$C_{24}$-alkyl ester of acrylic acid monomer, and a $C_1$-$C_{24}$-alkyl ester of methacrylic acid monomer;
   (b) 10 to 50% by weight of at least one polyvinyl monomer selected from the group consisting of a polyester of polyol and acrylic acid, a polyester of a polyol and methacrylic acid, a polyvinyl ether of a polyol, and a polyallyl ether of a polyol; and (c) 0 to 30% by weight of a mono-unsaturated, nonionizable monomer, which is different from the monomer (a), based on a total weight of monomers (a), (b) and (c).

2. The microcapsule of claim 1, wherein the microcapsule has an average particle size of from 1.5 to 15 μm and 90% of particles have a particle size of less than twice an average particle size.

3. The microcapsule of claim 1, wherein the polyvinyl monomer (b) is at least one selected from the group consisting of trimethylolpropane triacrylate, trimethylolpropane trimethacrylate, pentaerythritol triallyl ether, pentaerythritol tetraallyl ether, pentaerythritol triacrylate and pentaerythritol tetraacrylate.

4. The microcapsule of claim 1, obtained by a process comprising:
preparing an oil-in-water emulsion comprising the monomers (a), (b) and optionally, (c), a free-radical initiator, an inorganic protective colloid, and a lipophilic substance to be encapsulated, and
polymerizing the monomers to form the capsule wall.

5. The microcapsule of claim 4, wherein an amount of the inorganic protective colloid in the emulsion is 0.5-15% by weight, based on a water phase of the emulsion.

6. The microcapsule of claim 4, wherein the process further comprises, after capsule formation, conducting an afterpolymerization initiated with at least one salt of peroxodisulfuric acid as a free-radical initiator.

7. The microcapsule of claim 1, wherein the capsule core comprises a lipophilic substance with a solid/liquid phase transition in the temperature range from −20 to 120° C.

8. An aqueous dispersion comprising the microcapsule of claim 1.

9. A process for preparing the microcapsule of claim 1, the process comprising:
preparing an oil-in-water emulsion comprising the monomers (a), (b) and optionally (c), a free-radical initiator, a protective colloid and a lipophilic substance to be encapsulated;
initiating polymerization of the monomers by heating; and
optionally controlling the polymerization by further increasing the temperature above the temperature initiating the polymerization.

10. The process of claim 9, wherein the protective colloid is an inorganic protective colloid.

11. The process of claim 9, further comprising:
after capsule formation, conducting an afterpolymerization initiated by at least one salt of peroxodisulfuric acid as free-radical initiator.

12. A process for binding construction materials, the process comprising binding a construction material with a mineral, silicate or polymeric binder modified with the microcapsule of claim 1.

13. A process for modifying a gypsum construction board, the process comprising modifying the gypsum of the board with the microcapsule of claim 1.

14. A process for altering the heat transfer characteristics of a liquid, the process comprising adding the microcapsule of claim 1 to the liquid.

15. A construction material, comprising a mineral, silicatic or polymeric binder and the microcapsule of claim 1.

16. A gypsum construction board, comprising the microcapsule of claim 1.

17. A heat transfer liquid, comprising the microcapsule of claim 1 and a liquid.

* * * * *